(12) United States Patent
Liao

(10) Patent No.: US 8,049,972 B2
(45) Date of Patent: Nov. 1, 2011

(54) LENS ACTUATOR

(75) Inventor: Chia-Hung Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 222 days.

(21) Appl. No.: 12/488,552

(22) Filed: Jun. 20, 2009

(65) Prior Publication Data

US 2010/0142065 A1 Jun. 10, 2010

(30) Foreign Application Priority Data

Dec. 5, 2008 (CN) .......................... 2008 1 0305994

(51) Int. Cl.
G02B 15/14 (2006.01)
(52) U.S. Cl. ........................................ 359/699; 359/704
(58) Field of Classification Search .................. 359/694, 359/699, 704; 348/376, 373
See application file for complete search history.

(56) References Cited

U.S. PATENT DOCUMENTS 7,719,779 B2 * 5/2010 Yamashita .................... 359/824

* cited by examiner

*Primary Examiner* — Joseph P Martinez
(74) *Attorney, Agent, or Firm* — Altis Law Group, Inc.

(57) ABSTRACT

An exemplary lens actuator includes a movable unit, and a fixed unit. The movable unit includes a hollow body, and a plurality of first guiding members formed on the hollow body. The fixed unit includes a hollow cubic main body, and a plate body disposed on the top end of the hollow cubic main body. The hollow cubic main body and the plate body cooperatively define a receiving cavity for receiving the movable unit therein. The plate body faces the movable unit, and includes a through hole defined in the center of the plate body for allowing light to pass therethrough, and a plurality of second guiding members formed on the plate body. The second guiding members are coupled to the respective first guiding members for constraining the movable unit to move along the central axis of the through hole.

12 Claims, 4 Drawing Sheets

LENS ACTUATOR

BACKGROUND

1. Technical Field

The present disclosure relates to lens actuators, and particularly to voice coil motor type lens actuators.

2. Description of Related Art

Variable focal length lenses are widely used in optical systems. Optical systems incorporating such lenses can, for example, provide focused images of objects at varying distances without adjusting the distance between the lens and the image plane. Variable focal length lenses can also be used in optical systems that provide varying magnification without changing lenses.

Generally, an optical system includes an actuator, such as a step motor, to drive the lenses. However, the step motor is relatively large in volume. Use of the step motor requires a significant amount of space, which makes the optical system bulky.

Therefore, what is needed is a lens actuator adapted for driving the lenses with more compact structure.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
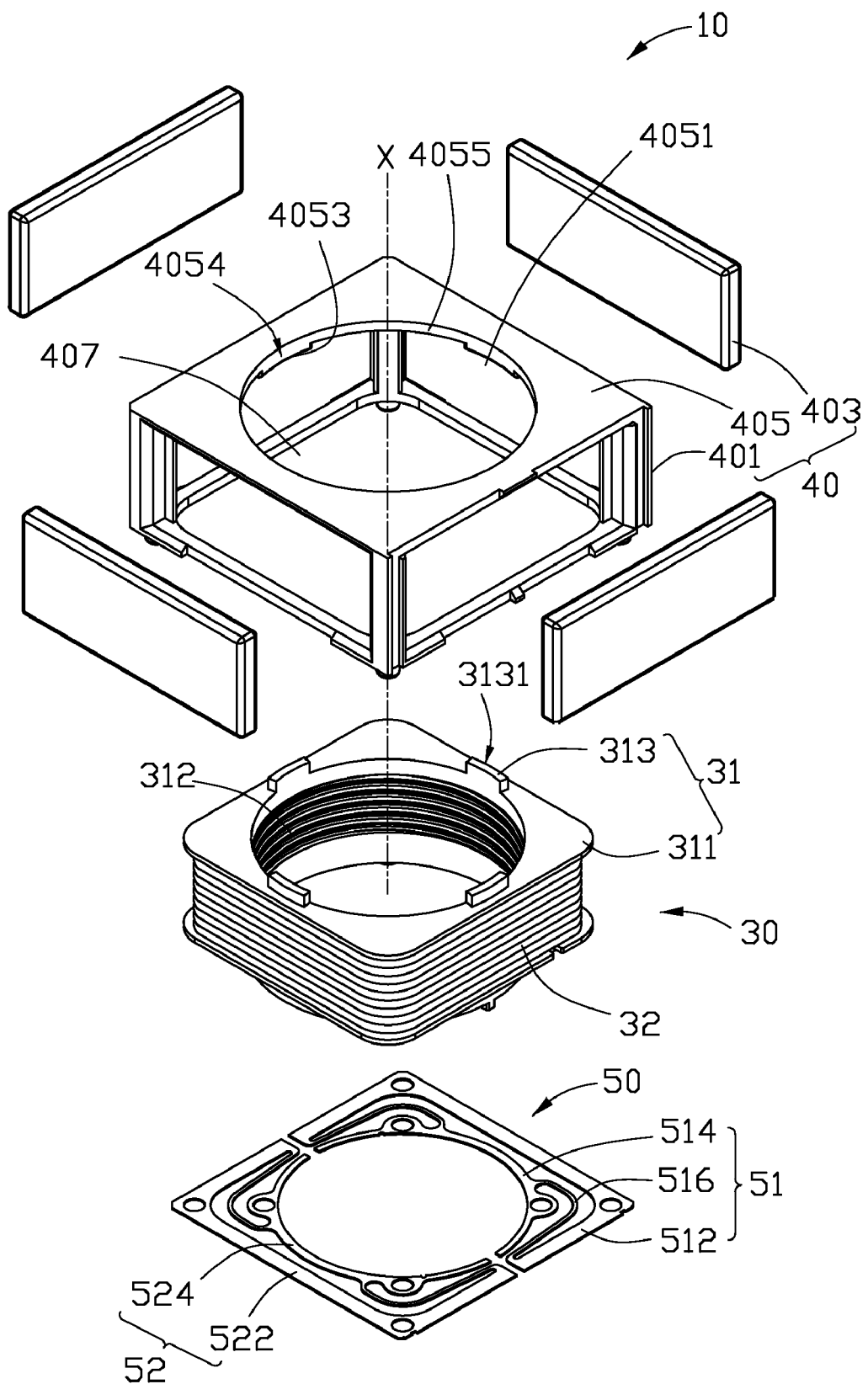
FIG. 1 is an exploded, isometric view of a lens actuator according to a first embodiment.

Referring to FIG. 1, a lens actuator 10, in accordance with a first embodiment, is shown. The lens actuator 10 includes a movable unit 30, a fixed unit 40, and a flat spring plate 50.

The movable unit 30 is movable relative to the fixed unit 40, and includes a movable barrel 31 and a coil 32 wrapped on the outer wall of the movable barrel 31. The movable barrel 31 includes a hollow body 311 with a first cylindrical receiving cavity 312 defined in the center thereof, and a plurality of first guiding members 313 formed on the top end of the hollow body 311. The first cylindrical receiving cavity 312 is configured for receiving lenses and filters (not shown) therein. In this embodiment, the first guiding members 313 are arc-shaped, and evenly spaced on and protrude from the top surface of the hollow body 311. In one embodiment, the first guiding member 313 may be integrally formed with the hollow body 311. In another embodiment, the first guiding member 313 may be fixed to the hollow body 311, for example, using an adhesive or by friction, such as by press-fitting. Each first guiding member 313 includes an arc-shaped outer surface 3131 facing away from the first cylindrical receiving cavity 312.

The fixed unit 40 includes a hollow cubic main body 401, a plurality of magnets 403 mounted on the hollow cubic main body 401, a plate body 405 disposed on the top end of the hollow cubic main body 401. The hollow cubic main body 401 and the plate body 405 cooperatively define a second receiving cavity 407 for receiving the movable unit 30 therein. In one embodiment, the plate body 405 may be integrally formed with the hollow cubic main body 401. In other embodiment, the plate body 405 may be fixed to the hollow cubic main body 401, for example, by using an adhesive or by a dovetail panel joint. The shape of the cross section of fixed unit 40 may be round, triangle, pentagonal or hexagonal, etc.

A through hole 4051 is defined in the center of the plate body 405 for allowing light to pass therethrough. The plate body 405 faces to the movable unit 30, and also includes a plurality of second guiding members 4053 coupled to the first guiding members 313 for constraining the movable barrel 31 to move along the central axis X of the through hole 4051. In this embodiment, the second guiding members 4053 are arc-shaped, and evenly spaced on and vertically protruding from the bottom surface of the plate body 405. Each second guiding member 4053 includes an arc-shaped inner surface 4054 facing the through hole 4051. In this embodiment, the four arc-shaped inner surfaces 4054 of the second guiding members 4053 are coupled to the four arc-shaped outer surfaces 3131 of the first guiding members 313 to ensure the movable barrel 31 moves along the central axis X of the through hole 4051.

In other embodiment, the four arc-shaped outer surface of the second guiding members 4053 may be coupled to the four arc-shaped inner surfaces of the first guiding members 313 to ensure the movable barrel 31 moves along the central axis X of the through hole 4051. In other embodiment, if the plate body 405 does not include a plurality of the second guiding members 4053, the four arc-shaped outer surfaces 3131 of the first guiding members 313 may be coupled to the inner surface 4055 of the plate body 405 to ensure the movable barrel 31 moves along the central axis X of the through hole 4051.

The flat spring plate 50 is square shaped, and includes a first half frame body 51 and a second half frame body 52. The first half frame body 51 includes a U-shaped outer frame 512, an arc-shaped inner frame 514, and two spring parts 516 connecting the U-shaped outer frame 512 with the arc-shaped inner frame 514.

For ease manufacturing, the structure of the second half frame body 52 is identical to that of the first half frame body 51. The second half frame body 52 also includes a U-shaped outer frame 522, and an arc-shaped inner frame 524. The U-shaped outer frames 512, 522 are glued (i.e., adhesively mounted) to the respective half bottom surface of the hollow cubic main body 401, the arc-shaped inner frames 514, 524 are glued to the respective half bottom surface of the hollow body 311. The U-shaped outer frames 512, 522 are electrically coupled to the two electrodes of electrical source (not shown), respectively. The arc-shaped inner frames 514, 524 are electrically coupled to the two ends of the coil 32, respectively.

Because the four arc-shaped inner surfaces 4054 of the second guiding members 4053 are coupled to the four arc-shaped outer surfaces 3131 of the first guiding members 313, when an electric current is applied to the coil 32 by the U-shaped outer frames 512, 522 electrically coupled to the two electrodes of electrical source, respectively, the coil 42 are excited to act upon the magnets 44, thereby producing a magnetic force to drive the movable barrel 32 to move along the central axis X of the through hole 4051.

Figure 2:
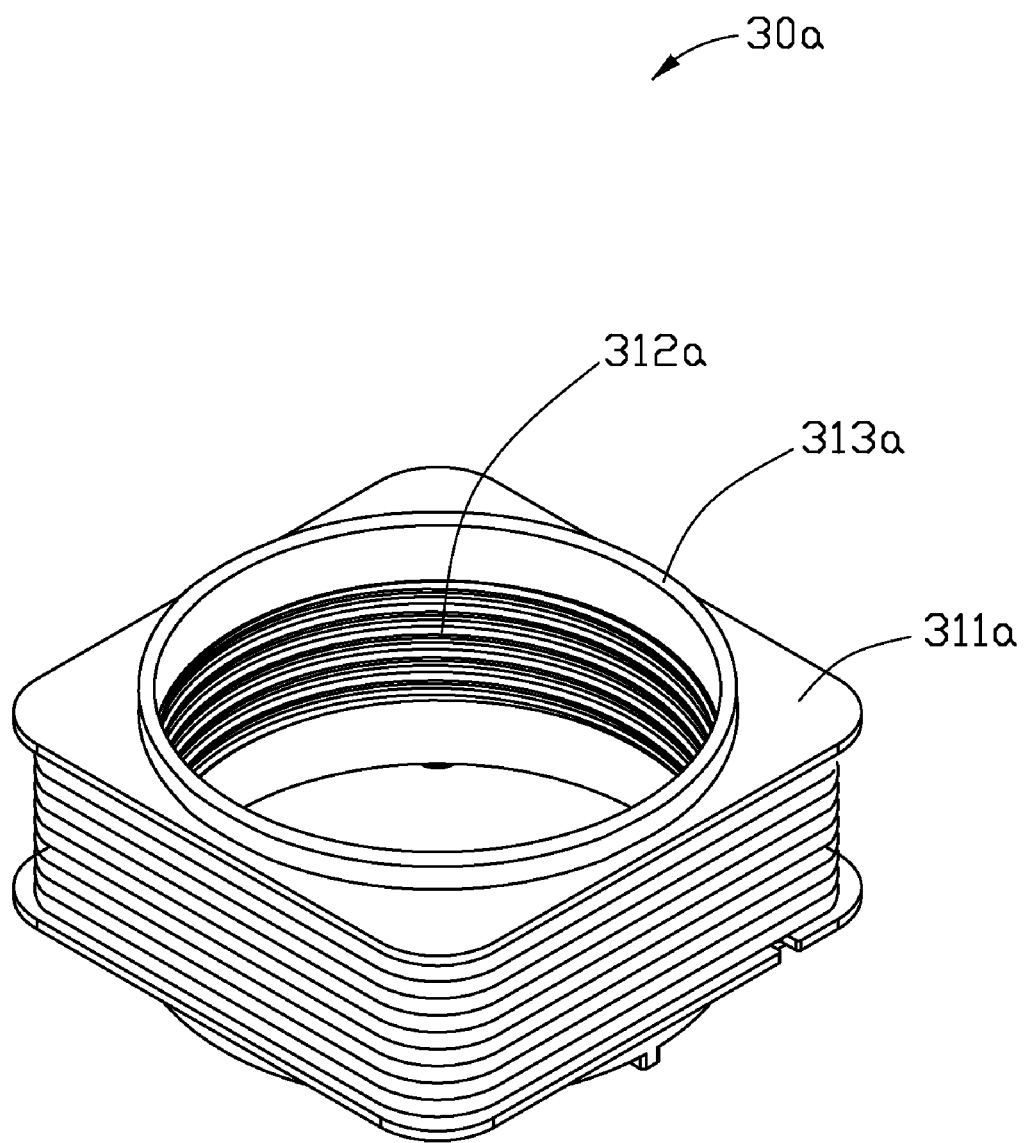
FIG. 2 is a schematic, isometric view of a movable unit according a second embodiment.

Referring to FIG. 2, a movable unit 30a, in accordance with a second embodiment, is shown. The movable unit 30a includes a hollow body 311a with a first cylindrical receiving cavity 312a defined in the center thereof, and a first ring-shaped guiding member 313a coaxial to the first cylindrical receiving cavity 312a. The first ring-shaped guiding member 313a vertically protrudes from the top surface of the hollow body 311a. The first ring-shaped guiding member 313a may be coupled to the second guiding members 4053 (see FIG. 1) to ensure the movable barrel 32 moves along the central axis X of the through hole 4051.

Figure 3:
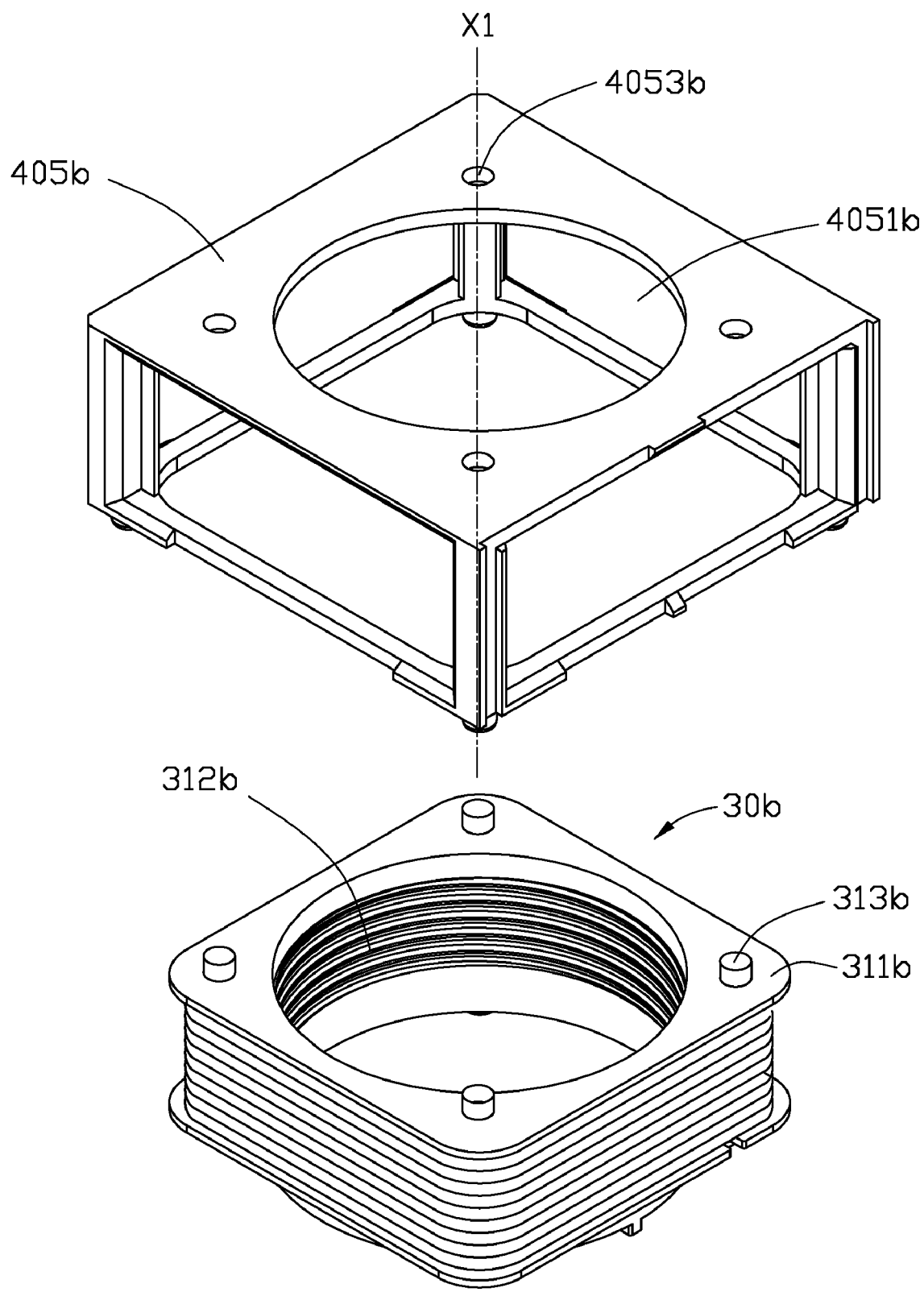
FIG. 3 is an exploded, isometric view of a fixed body and a movable unit according to a third embodiment.

Referring to FIG. 3, a movable unit 30b, and a plate body 405b with a through hole 4051b defined in the center thereof, in accordance with a third embodiment, are shown. The movable unit 30b includes a hollow body 311b with a first cylindrical receiving cavity 312b defined in the center thereof, four first guiding members 313b vertically protruding from the top surface of the hollow body 311b. The plate body 405b also includes four second guiding members 4053b. Each second guiding member 4053b is a through hole defined in the plate body 405b, and respectively corresponds to each first guiding member 313b for constraining the hollow body 311b to move along the central axis X1 of the through hole 4051b. In other embodiment, the first guiding member 313b can instead be a groove defined on the top surface of the top surface of the hollow body 311b, the second guiding member 4053b can correspondingly instead be a pin protruding from the bottom surface of the plate body 405b.

Figure 4:
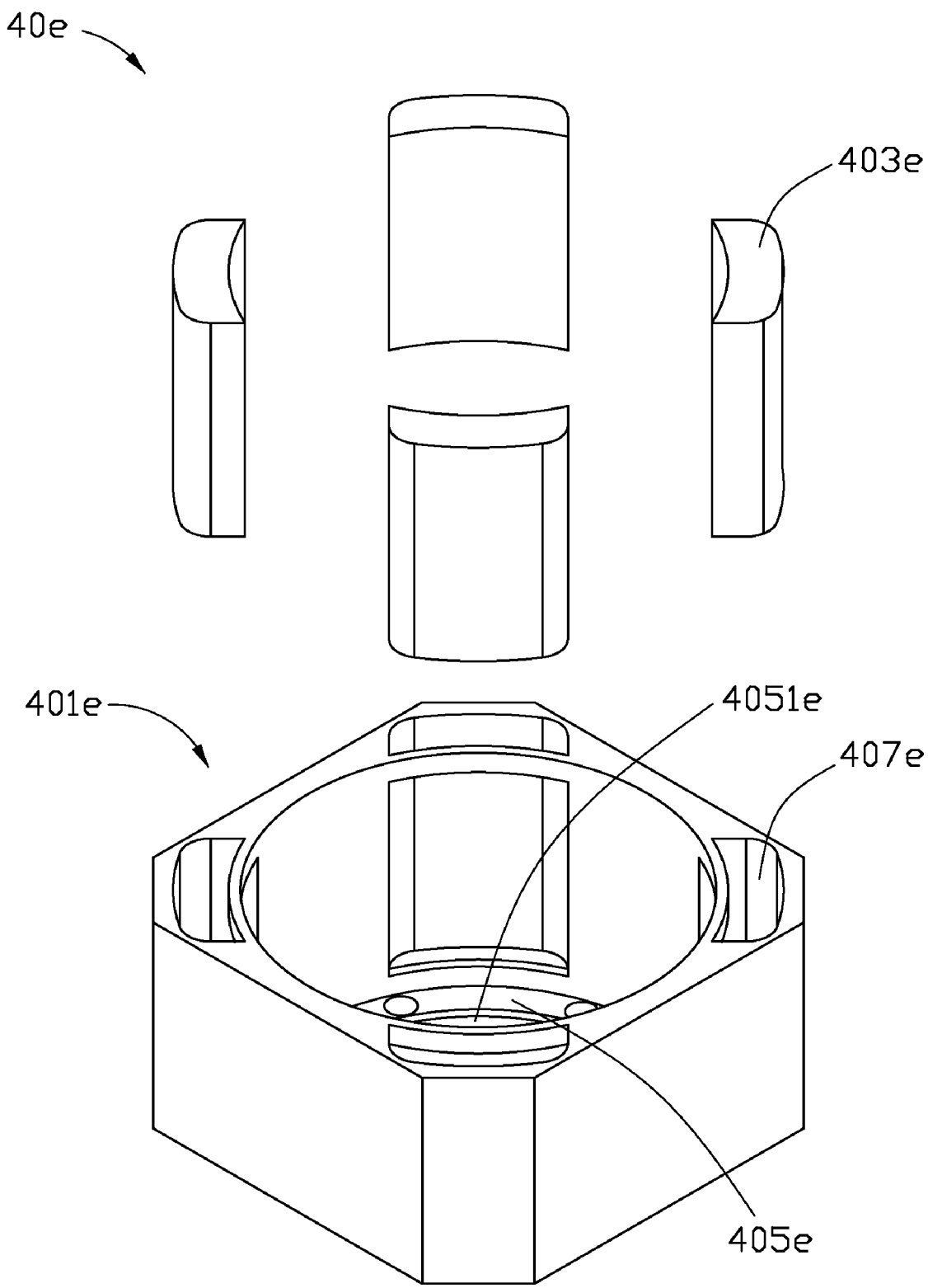
FIG. 4 is an exploded, isometric of a fixed unit according to a fourth embodiment.

Referring to FIG. 4, a fixed unit 40e, in accordance with a fourth embodiment, is shown. The fixed unit 40e includes a hollow main body 401e, four magnets 403e mounted on the hollow main body 401e, a plate body 405e disposed on the bottom end of the hollow main body 401e. Four receiving grooves 407e are defined on the top surface of the hollow main body 401e for respectively receiving the respective magnets 403e therein. A through hole 4051e is defined in the center of the plate body 405e for allowing light to pass therethrough.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope of the appended claims.

What is claimed is:

1. A lens actuator comprising:
   a movable unit, the movable unit comprising a hollow body and a first guiding member formed on the hollow body, the first guiding member being ring-shaped, and vertically protruding from a top surface of a top end of the hollow body;
   a fixed unit, the fixed unit comprising a hollow main body and a plate body disposed on the top end of the hollow main body, the hollow main body and the plate body cooperatively defining a receiving cavity for receiving the movable unit therein, the plate body facing the movable unit, the plate body comprising a through hole defined in the center of the plate body for allowing light to pass therethrough, and at least one second guiding member formed on the plate body, the at least one second guiding member being coupled to the first guiding member for constraining the movable unit to move along a central axis of the through hole.

2. The lens actuator of claim 1, wherein the at least one second guiding member includes a plurality of the second guiding members formed on the bottom surface facing the movable unit of the plate body, each second guiding member is arc-shaped, and comprises an arc-shaped inner surface facing the through hole, the arc-shaped inner surfaces of the second guiding members are coupled to the outer surface of the first guiding member to constrain the movable unit to move along the central axis of the through hole.

3. The lens actuator of claim 1, further comprising a plurality of magnets, wherein the top surface of the hollow main body defines a plurality of receiving grooves for respectively receiving the magnets therein.

4. The lens actuator of claim 1, further comprising a flat spring plate, wherein the flat spring plate comprises a first half frame body and a second half frame body, each of the first half frame body and the second half frame body comprises a U-shaped outer frame, an arc-shaped inner frame, and two spring parts connecting the U-shaped outer frame with the arc-shaped inner frame, the U-shaped outer frames of the first and second half frame bodies are glued to respective half bottom surfaces of the hollow main body, and the arc-shaped inner frames of the first and second half frame bodies are glued to the respective half bottom surfaces of the hollow body.

5. A lens actuator comprising:
   a movable unit, the movable unit comprising a hollow body and a plurality of first guiding members formed on the hollow body, the plurality of first guiding members vertically protruding from a top surface of a top end of the hollow body, and
   a fixed unit, the fixed unit comprising a hollow main body and a plate body disposed on the top end of the hollow main body, the hollow main body and the plate body cooperatively defining a receiving cavity for receiving the movable unit therein, the plate body facing the movable unit, the plate body comprising a through hole defined in the center of the plate body for allowing light to pass therethrough and at least one second guiding member formed on the plate body, the at least one second guiding member being coupled to the plurality of first guiding members for constraining the hollow body to move along a central axis of the through hole.

6. The lens actuator of claim 5, further comprising a flat spring plate, wherein the flat spring plate comprises a first half frame body and a second half frame body, each of the first half frame body and the second half frame body comprises a U-shaped outer frame, an arc-shaped inner frame, and two spring parts connecting the U-shaped outer frame with the arc-shaped inner frame, the U-shaped outer frames of the first and second half frame bodies are glued to respective half bottom surfaces of the hollow main body, and the arc-shaped inner frames of the first and second half frame bodies are glued to the respective half bottom surfaces of the hollow body.

7. The lens actuator of claim 6, further comprising a plurality of magnets, wherein the top surface of the hollow main body defines a plurality of receiving grooves for respectively receiving the magnets therein.

8. The lens actuator of claim 7, wherein the plurality of first guiding members are evenly spaced on the top surface of the hollow body.

9. The lens actuator of claim 8, wherein the at least one second guiding member comprise a plurality of through holes defined in the plate body.

10. A lens actuator, comprising:
    a movable unit, the movable unit comprising a hollow body and at least one first guiding member formed on the hollow body;
    a fixed unit, the fixed unit comprising a hollow main body, and a plate body disposed on a top end of the hollow main body, the hollow main body and the plate body cooperatively defining a receiving cavity for receiving the movable unit therein, the plate body facing the movable unit, the plate body comprising at least one through hole defined in the plate body, the at least one through hole engagingly receiving at least one first guiding member for constraining the movable unit to move along the central axis of the through hole; and a flat spring plate, wherein the flat spring plate comprises a first half frame body and a second half frame body, each of the first half frame body and the second half frame body comprises a U-shaped outer frame, an arc-shaped inner frame, and two spring parts connecting the U-shaped outer frame with the arc-shaped inner frame, the U-shaped outer frames of the first and second half frame bodies are glued to respective half bottom surfaces of the hollow main body, and the arc-shaped inner frames of the first and second half frame bodies are glued to the respective half bottom surfaces of the hollow body.

11. The lens actuator of claim 10, wherein the at least one first guiding member includes a plurality of first guiding members which are evenly spaced on a top surface of the top end of the hollow body.

12. The lens actuator of claim 10, further comprising a plurality of magnets, wherein the top surface of the hollow main body defines a plurality of receiving grooves for respectively receiving the magnets therein.

\* \* \* \* \*